United States Patent
Pruett, Jr. et al.

(10) Patent No.: US 7,919,129 B2
(45) Date of Patent: Apr. 5, 2011

(54) SYSTEM AND METHOD FOR SPRAYING MEAT PRODUCTS WITH AN ANTI-MICROBIAL AGENT

(75) Inventors: Wayne P. Pruett, Jr., Cincinnati, OH (US); Kevin G. Mellor, Omaha, NE (US); Donald N. Sinnot, Oswego, IL (US); Gilbert L. Boldt, Naperville, IL (US)

(73) Assignee: ConAgra Foods RDM, Inc., Omaha, NE (US)

( * ) Notice: Subject to any disclaimer, the term of this patent is extended or adjusted under 35 U.S.C. 154(b) by 1182 days.

(21) Appl. No.: 11/337,191

(22) Filed: Jan. 20, 2006

(65) Prior Publication Data

US 2006/0193954 A1    Aug. 31, 2006

Related U.S. Application Data

(60) Provisional application No. 60/646,100, filed on Jan. 21, 2005.

(51) Int. Cl.
*A61K 31/19*    (2006.01)
(52) U.S. Cl. .......... 426/320; 426/335; 426/321; 99/534; 134/199; 118/30
(58) Field of Classification Search .................. 426/235, 426/335, 321, 320; 99/534; 134/199; 118/13, 118/21, 31, 30, 300
See application file for complete search history.

(56) References Cited

U.S. PATENT DOCUMENTS

| 3,576,158 | A | * | 4/1971 | Greenspan et al. | ............. | 99/484 |
| 3,719,504 | A | * | 3/1973 | Greenspan et al. | ............. | 99/353 |
| 4,709,713 | A | * | 12/1987 | Kuhl | ............................... | 134/72 |
| 6,436,891 | B1 | | 8/2002 | Kemp et al. | | |
| 6,572,908 | B2 | | 6/2003 | Kemp et al. | | |

(Continued)

FOREIGN PATENT DOCUMENTS

AU    771148    7/2004

(Continued)

OTHER PUBLICATIONS http://meat.tamu.edu/prime/archives/feb03Prime.pdf. (Feb. 2003, p. 1-4).*

(Continued)

*Primary Examiner* — Drew E Becker
*Assistant Examiner* — Steven Leff
(74) *Attorney, Agent, or Firm* — Advent IP; Ryan T. Grace

(57) ABSTRACT

System and method for applying an antimicrobial agent, such as acidified calcium sulfate (ACS), to unpackaged meat products, in order to eliminate or reduce existing food borne bacterial pathogens and to prevent their growth when the meat products are stored. A conveyor transports unpackaged meat products to a spray chamber having nozzles positioned above and below the conveyor and meat products. The conveyor can be a wire conveyor having wires having a thickness so that they can support the food items, which can be eight to ten pounds, while being small enough so that the they do not block ACS solution sprays from the bottom nozzles, or do so to a negligible degree. The lower nozzles spray ACS solution through apertures of the conveyor and onto at least the bottom surfaces of the unpackaged meat products. The solution is sprayed with a sufficiently high pressure and sufficiently small drop size so that the ACS solution penetrates into tissues of the unpackaged meat products.

35 Claims, 11 Drawing Sheets

U.S. PATENT DOCUMENTS

| | | |
|---|---|---|
| 6,808,730 B2 | 10/2004 | Kemp et al. |
| 6,881,424 B1 | 4/2005 | Kemp et al. |
| 6,902,753 B1 | 6/2005 | Kemp et al. |
| 2002/0197365 A1 | 12/2002 | Kemp et al. |
| 2003/0023084 A1 | 1/2003 | Burgard |
| 2003/0050199 A1 | 3/2003 | Kemp et al. |
| 2003/0199583 A1* | 10/2003 | Gutzmann et al. ............ 514/558 |
| 2004/0018284 A1 | 1/2004 | Kuethe et al. |
| 2005/0053704 A1 | 3/2005 | Kemp et al. |
| 2005/0084471 A1 | 4/2005 | Andrews et al. |

FOREIGN PATENT DOCUMENTS

| | | |
|---|---|---|
| AU | 774058 | 9/2004 |
| WO | WO 2004083252 A2 * | 9/2004 |

OTHER PUBLICATIONS http://www.mionix.com/products-information/RTE01.htm, p. 1-2 date Jun. 25, 2010.*

Federal Register, vol. 68, No. 109, Section 430, Jun. 6, 2003, "Control of *Listeria monocytogenes* In Ready-To-Eat Meat and Poultry Products; Final Rule," 34208-34254.

Federal Register, vol. 68, No. 109, Section 430.1, Jan. 1, 2005, "Control of *Listeria monocytogenes* In Ready-To-Eat Meat and Poultry Products, Final Rule," 659-660.

Federal Register, vol. 68, No. 109, Section 430.4 Jan. 1, 2005, "Control of *Listeria monocytogenes* In Ready-To-Eat Meat and Poultry Products, Final Rule," 660-662.

FSIS Directive 10,240.4, Oct. 2, 2003, Attachments 1-5.

AMI Foundation News, vol. 5, Issue 1, Jan. 2003, "Surface Treatments of Acidified Calcium Sulfate Reduce *Listeria* on RTE Products," 1,4.

Food Technology News and Analysis, vol. 57, No. 2, Feb. 2003, "Eaters' Appetites Swayed by Portion Size," 6, 8, 10.

Q.C. Quarterly, Feb. 2003, "Controlling *Listeria*," 53, 54, 56, 58.

American Meat Institute Foundation,, Nov. 2002, "Antimicrobial Effects of Surface Treatments and Ingredients on Cured RTE Meat Products," 1-51.

* cited by examiner

Lethality and Growth of Listeria monocytogenes in Deli Products Treated with ACS

| Product | Time (sec) | Temp (F) | Treatment | Lethality Initial Reduction Log10 | Maximum Increase During Shelf Life 70 Days at 4 C Log10 | Change in Count by End of Shelf Life 70 Days at 4 C Log10 | Alternative Category[1] Minimum Criteria | Alternative Category[1] Recommended Criteria |
|---|---|---|---|---|---|---|---|---|
| 1110 | 1120 | 1130 | 1140 | 1150 | 1160 | 1170 | 1180 | 1190 |
| Oven Roasted Turkey Breast | 40 | 190 | RTE 01 | 2.08 | No change | minus 0.044 | 1 | 1 |
| Honey Smoked Turkey Breast | 20 | 40 | RTE 01 | 3.61 | 1.70 | 1.70 | 1 | 2 |
| Honey Smoked Turkey Breast | 40 | 40 | RTE 01 | 3.43 | 2.54 | 2.54 | 2 | 2 |
| Honey Smoked Turkey Breast | 20 | 140 | RTE 01 | 2.88 | 2.17 | 2.17 | 2 | 2 |
| Honey Smoked Turkey Breast | 40 | 140 | RTE 01 | 2.84 | 0.60 | 0.60 | 1 | 1 |
| Ham | 40 | 40 | RTE 01 | 3.92 | No change | minus 1.43 | 1 | 1 |
| Ham | 20 | 140 | RTE 01 | 3.78 | 1.29 | 1.29 | 1 | 2 |
| Ham | 40 | 140 | RTE 01 | 3.16 | 0.71 | minus 1.02 | 1 | 1 |
| Roast Beef | 20 | 140 | RTE 01 | 2.02 | 1.02 | minus 0.30 | 1 | 2 |
| Roast Beef | 40 | 140 | RTE 01 | 2.62 | 1.13 | 0.18 | 1 | 2 |
| Roast Beef | 40 | 190 | RTE 01 | 3.88 | 0.60 | No change | 1 | 1 |
| Oven Roasted Turkey Breast | 20 | 140 | RTE 03 | 2.23 | No change | minus 0.66 | 1 | 1 |
| Oven Roasted Turkey Breast | 40 | 140 | RTE 03 | 3.03 | No change | minus 0.51 | 1 | 1 |
| Roast Beef | 40 | 140 | RTE 03 | 3.41 | 0.60 | minus 0.40 | 1 | 1 |
| Ham | 40 | 40 | RTE 03 | 1.79 | 0.06 | 0.06 | 1 | 2 |
| Ham | 20 | 140 | RTE 03 | 2.29 | 1.74 | minus 0.58 | 1 | 2 |
| Ham | 40 | 140 | RTE 03 | 3.31 | 1.94 | 1.94 | 1 | 2 |

[1] FSIS Alternative Categories are based on effectiveness of Lethality Treatments and effectiveness of Antimicrobial Agents/Processes for growth suppression.
Minimum FSIS requirement for Alternative 2 is lethality >1 log or growth suppression allowing no more than 2 logs increase over shelf life of the product.
Minimum FSIS requirements for Alternative 1 are lethality >1 log and growth suppression allowing no more than 2 logs increase over shelf life of the product.
Recommended FSIS requirements for Alternative 1 are lethality >2 logs and growth suppression allowing no more than 1 log increase over shelf life of the product.

Figure 11

SYSTEM AND METHOD FOR SPRAYING MEAT PRODUCTS WITH AN ANTI-MICROBIAL AGENT

CROSS-REFERENCE TO RELATED APPLICATION

This application claims priority under 35 U.S.C. §119 of Provisional Application No. 60/646,100, filed Jan. 21, 2005, the contents of which are incorporated herein by reference as though set forth in full.

FIELD OF THE INVENTION

The present invention relates to treating meat products with antimicrobial agents, and more particularly, to spraying acidified calcium sulfate onto meat products carried on a conveyor.

BACKGROUND

The food industry has struggled to develop effective antimicrobial treatments for controlling the growth of foodborne pathogens on uncured meat products (particularly poultry products) that are cost and time efficient and acceptable to consumers. The United States Department of Agriculture (USDA) and its Food Safety and Inspection Service (FSIS) have issued regulations related to controlling *Listeria monocytogenes*, a food borne pathogen that can cause potentially fatal infections in newborns, the elderly and other immunocompromised individuals.

Specifically, as discussed in 9 C.F.R. §430.1 and 430.4 (Jan. 1, 2005), *L. monocytogenes* can contaminate Ready-To-Eat (RTE) products that are exposed to the environment after they have undergone lethality treatment. In order to enhance product safety and verify sanitary processing conditions, companies that produce post-lethality exposed RTE products must comply with requirements that are set forth in certain Alternatives, Alternative 1 is the most stringent alternative. Alternatives 1 and 2 are discussed in further detail for reference.

Alternative 1 involves a post-lethality treatment (which may involve an antimicrobial agent) that reduces or eliminates microorganisms on the product. Alternative 1 also involves use of an antimicrobial agent or process that suppresses or limits the growth of *L. monocytogenes* over time. An antimicrobial agent is a substance in or added to an RTE product that reduces or eliminates a microorganism, including pathogens such as *L. monocytogenes*, or that suppresses or limits growth of pathogens throughout the shelf life of the product. Examples antimicrobial agents include acidified calcium sulfate (ACS), potassium lactate and sodium diacetate.

Under the regulations set forth in 9 C.F.R. §430, dated Jun. 6, 2003 and Food Safety and Inspection Services (FSIS) directives, Alternative 1 required that the initial reduction of pathogens in or on the meat product be greater than 1 log after an antimicrobial agent was applied or injected into the food item and, in addition, less than 2 log growth after the initial reduction, e.g., during shelf storage. Under current regulations set forth in 9 C.F.R. §430, dated Jan. 1, 2005 and FSIS directives, the current Alternative 1 standard is more stringent than the prior Alternative 1 standard and requires greater than 2 log initial reduction (compared to greater than 1 log reduction), and less than 1 log growth (compared to less than 2 log growth). Thus, the current Alternative 1 increased the level of initial pathogen reduction, and allows for less pathogen growth over time compared to the prior Alternative 1 standard.

Alternative 2 involves use of either a post-lethality treatment (which may involve an antimicrobial agent) that reduces or eliminates microorganisms on the product, or an antimicrobial agent or process that suppresses or limits growth of *L. monocytogenes*. Alternative 2 can be satisfied with either post-lethality treatment or the use of an antimicrobial agent, whereas Alternative 1 requires both of these treatments. Alternative 2 requires that the reduction of pathogens in or on the meat product be reduced by greater than 1 log reduction, or less than 2 log growth after the initial reduction, e.g., during shelf storage.

ACS has been recognized and approved as an antimicrobial agent for treating RTE meat products. ACS is useful for killing *L. monocytogenes* on food surfaces, and for preventing or limiting growth of *L. monocytogenes* after an initial ACS application, e.g., during shelf storage or shipping. Two known methods for applying ACS to meat products are dipping and spraying meat products.

Known dip methods involve dipping meat products into a bath of ACS for a certain amount of time. With known dip methods, however, the ACS may not sufficiently purge liquids on the exterior surface of the produce and penetrate into the meat products. Instead, the ACS may be applied to only the outer surface. Thus, while the entire meat product may be covered by ACS when dipped, the amount of ACS that penetrates the meat product may be negligible or may be insufficient for purposes of satisfying Alternatives 1 and 2. Higher concentrations of ACS may, therefore, be required with dip methods, which can negatively impact the taste of the product.

Known spray methods involve spraying meat products with ACS. Known spray methods, however, have not been implemented in a cost efficient manner while satisfying Alternatives 1 and 2. For example, the extent to which the ACS penetrates the meat products is limited. Further, known spray systems may not apply ACS to all or substantially all of the meat product surfaces, thus causing more potential difficulties with satisfying the Alternatives. Consequently, known spray systems may not apply sufficient quantities of ACS to meat product surfaces, leave certain surfaces untreated, and provide only limited ACS penetration through the outer surface of the meat product.

Accordingly, there exists a need for a system and method that applies ACS to all or substantially all of the surfaces of a meat product to reduce surface pathogens, and to ensure that sufficient quantities of ACS penetrate meat products to prevent future pathogen growth to satisfy USDA and FSIS regulations. There is also a need for a system and method that can achieve these results in a large-scale commercial environment in a time and cost efficient manner. There is also a need for a method that effectively applies ACS to meat products while maintaining the taste of meat products. Embodiments of the invention fulfill these unmet needs.

SUMMARY

According to one embodiment, a method for applying acidified calcium sulfate (ACS) to meat products includes providing a plurality of unpackaged meat products on a conveyor that defines apertures and spraying a solution having acidified calcium sulfate onto the unpackaged meat products. The solution is sprayed from a top nozzle positioned above the conveyor and from a bottom nozzle positioned below the conveyor. Solution sprayed by the bottom nozzle passes through the conveyor apertures and is applied to the bottom surfaces of the unpackaged meat products.

According to another embodiment, a method for applying acidified calcium sulfate to meat products includes providing a plurality of unpackaged meat products on a conveyor having apertures and spraying a solution having acidified calcium sulfate onto substantially all of the surfaces of each unpackaged meat product. The sprays are applied from nozzles positioned above the conveyor and from nozzles positioned below the conveyor. Solution sprayed from nozzles positioned below the conveyor passes through the conveyor apertures and onto bottom surfaces of the meat products. With embodiments, no acidified calcium sulfate solution is applied to unpackaged meat products by dipping meat products into acidified calcium sulfate solution.

According to a further alternative embodiment, a system for applying ACS to meat products includes a conveyor and first and second spray nozzles. The conveyor transports unpackaged meat products and defines a plurality of apertures. The first nozzle is positioned above the conveyor and sprays ACS solution onto unpackaged meat products below. The second nozzle is positioned below the conveyor and sprays ACS solution through the conveyor apertures and onto the bottom surfaces of the unpackaged meat products above.

According to another alternative embodiment, a system for applying ACS to meat products includes a conveyor, a first plurality of nozzles and a second plurality of nozzles. The conveyor transports unpackaged meat products and includes wires that define apertures. The ratio of the width of a wire to a length or width of a bottom surface of an unpackaged meat product is sufficiently small so that all or substantially all of the bottom surface of the meat product is exposed to solution. The first plurality of nozzles is positioned above the conveyor and sprays solution onto unpackaged meat products below. The second plurality of nozzles is positioned below the conveyor and sprays solution through the conveyor apertures and to the bottom surfaces of the unpackaged meat products above. The nozzles spray solution with a sufficiently high pressure and a sufficiently small drop size so that the ACS solution penetrates into tissues of the unpackaged meat products.

In various embodiments, an ACS solution can also be applied to unsprayed meat products from a reservoir. However, methods and systems do not utilize dipping. Spray exposure and/or penetration can be adjusted by adjusting spray times, pressures, drop sizes and by adjusting conveyor speeds and aperture configurations. According to certain embodiments, a conveyor speed is about 1 to 165 inches per second, exposure time is about 5 to 60 seconds, solution pressure is sprayed at about 5 psi to about 50 psi and the drop size is about 1/64" to about 1/4". Different ACS solution temperatures can also be utilized, including about 40° F., about 140° F. and about 190° F. so that the combination of ACS and the temperature of the solution synergistically achieve desired bacteria reduction and growth prevention The concentration of the solution sprayed onto meat products can be about 3:1 water: ACS solution.

BRIEF DESCRIPTION OF THE DRAWINGS

Referring now to the drawings, in which like reference numbers represent corresponding parts throughout, and in which:

FIG. 11 is a chart summarizing the effectiveness of embodiments by satisfying Alternatives 1 and 2.

DETAILED DESCRIPTION OF ILLUSTRATED EMBODIMENTS

Embodiments of the invention are directed to a system and method for spraying a solution having an antimicrobial agent, such as acidified calcium sulfate ("ACS solution") and a lactic acid solution, onto unpackaged or unprocessed meat products. This specification refers to ACS solution for purposes of explanation. ACS solution is applied to all or substantially all of the outer surfaces of the unpackaged meat products to initially reduce pathogens, including *L. monocytogenes*. Embodiments advantageously apply ACS solution to a higher percentage of the surface area of meat products than known spray methods. Further, embodiments advantageously apply ACS solution so that the ACS solution removes loose materials and liquid purge and penetrates into the meat product tissues to reduce or prevent future pathogen growth when the meat products are stored or shipped for extended durations, thereby improving shortcomings of known dip and spray systems. System and method embodiments have been shown to meeting the requirements of Alternatives 1 and 2 as set forth in 37 C.F.R. §430 and FSIS directives, and can be integrated with other food processing systems and system components or stations.

Figure 1:
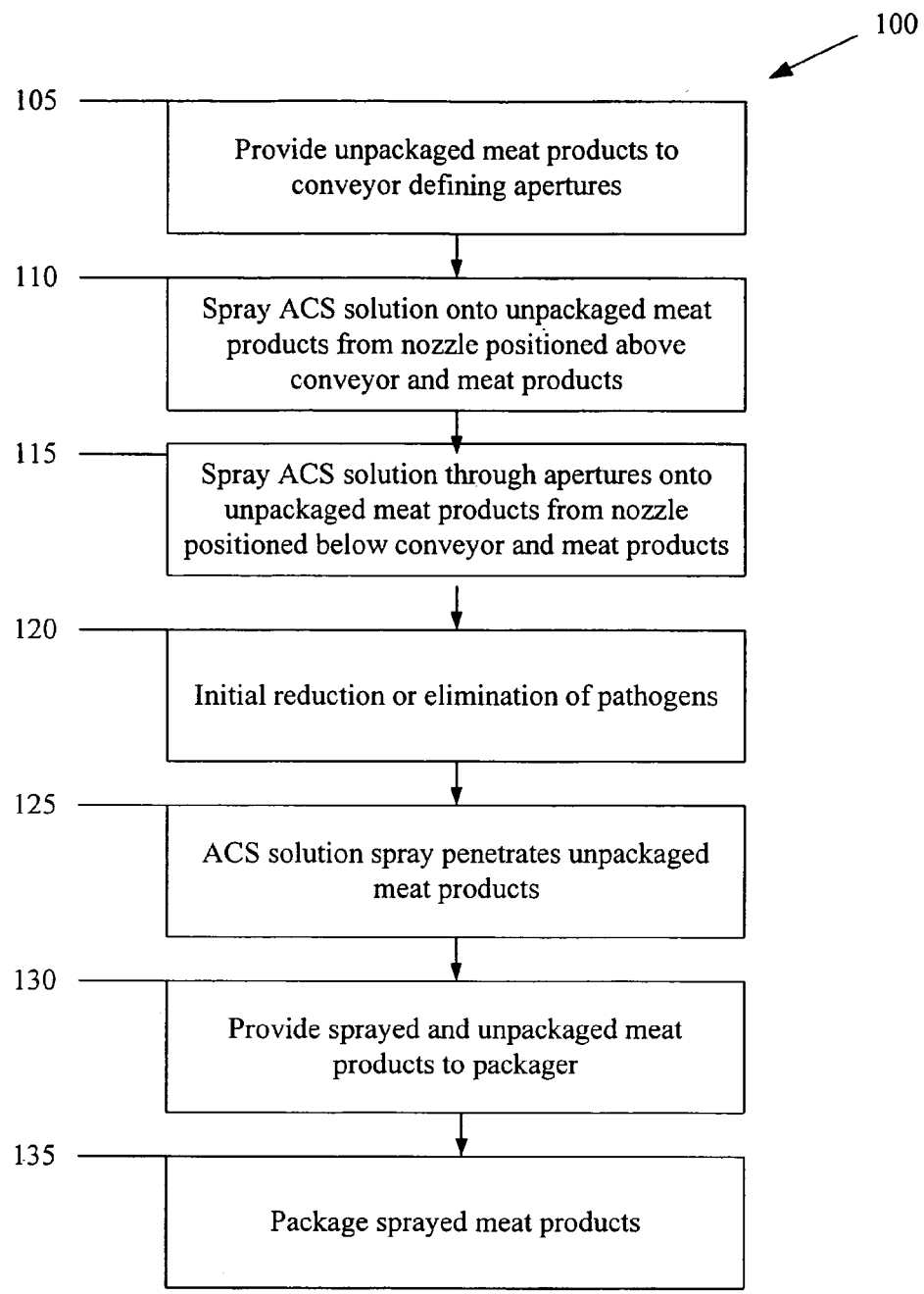
FIG. 1 is a flow chart illustrating a method of spraying a solution having an antimicrobial agent onto unpackaged meat products using nozzles positioned above and below meat products according to one embodiment.

Referring to FIG. 1, one embodiment of the invention is directed to a method 100 of applying an antimicrobial agent to unpackaged meat products by spraying a solution containing the antimicrobial agent onto the meat products. This specification refers to an ACS solution for purposes of explanation. Further, persons skilled in the art will appreciate that embodiments can be applied to various types of cured and uncured meat products including, but not limited to, ham (e.g., honey baked ham), roast beef, poultry, oil browned meats, spice rubbed meats, oven roasted turkey, non-ham pork products, seafood and lamb. The meat products can be various shapes, sizes and weights, e.g., up to about 8.5"×9.5"×6"±⅝" and weighing up to about 8.75-9.75 pounds, ±½ pound. This specification refers to meat products generally, and the term meat products is intended to include these and other meat products that could be treated with an ACS solution.

In step 105, unpackaged meat products are provided or carried by a conveyor that defines a plurality of gaps or apertures. This specification refers to unpackaged meat products as bare meat products, i.e., meat products that do not have any wrapping or packaging.

In step 110, an ACS solution is sprayed onto the unpackaged meat products from a nozzle positioned above the conveyor and meat products. In step 115, the ACS solution is sprayed through apertures or gaps of the conveyor and onto unpackaged meat products above from a nozzle positioned below the conveyor and the meat products.

In step 120, the applied ACS solution initially reduces or eliminates pathogens, such as *L. monocytogenes*. This is otherwise referred to as an initial lethality treatment. In step 125, the ACS solution is sprayed so that it penetrates into the pores of the unpackaged meat products and into the meat product tissue to eliminate or reduce future pathogen growth during storage or shipping.

In step 130, the sprayed unpackaged meat products are provided to a packager, such as a bagger, netter or other suitable packaging system. In step 135, the sprayed meat products are packaged and can be prepared for shipment or storage.

Figure 2:
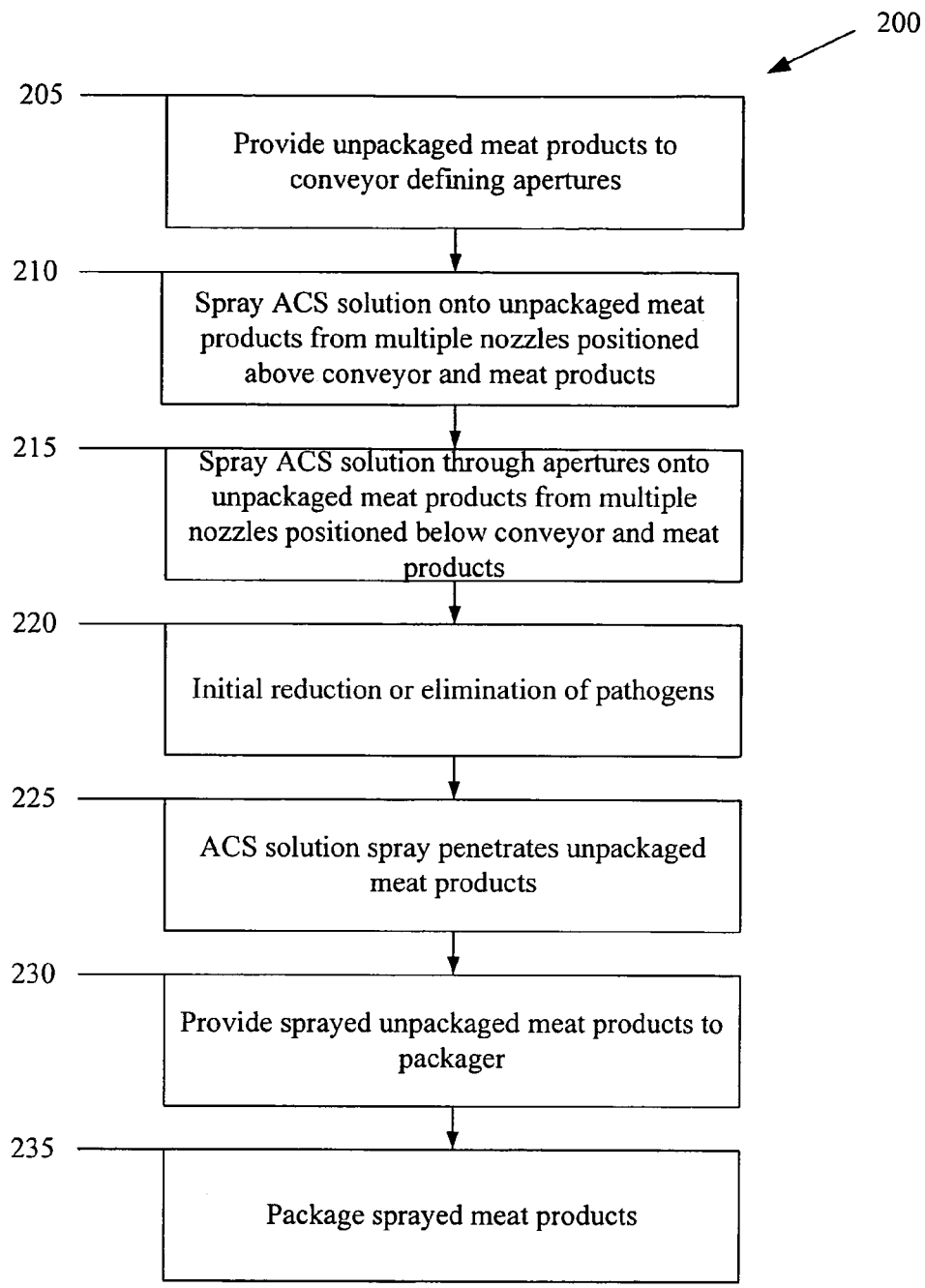
FIG. 2 is a flow chart illustrating a method of spraying a solution having an antimicrobial agent onto unpackaged meat products using multiple nozzles positioned above meat products and multiple nozzles positioned below meat products according to one embodiment.

Referring to FIG. 2, according to an alternative embodiment, the method shown in FIG. 1 can be implemented using multiple nozzles positioned above or below the conveyor and unpackaged meat products. For example, an ACS solution can be sprayed from multiple nozzles positioned above the conveyor and unpackaged food items and from multiple nozzles positioned below the conveyor and unpackaged food items. In step 205, unpackaged meat products are provided or carried by a conveyor defining apertures, and in step 210, ACS solution is sprayed onto the unpackaged meat products from multiple nozzles positioned above the conveyor and meat products. In step 215, ACS solution is also sprayed through apertures or gaps of the conveyor and onto unpackaged meat products from multiple nozzles positioned below the conveyor and meat products. In step 220, the applied ACS solution reduces or eliminates pathogens, and in step 225, the spray penetrates into pores of the meat products to prevent future pathogen growth. In step 230, sprayed unpackaged meat products are provided to a packager, and packaged or bagged in step 235.

Figure 3:
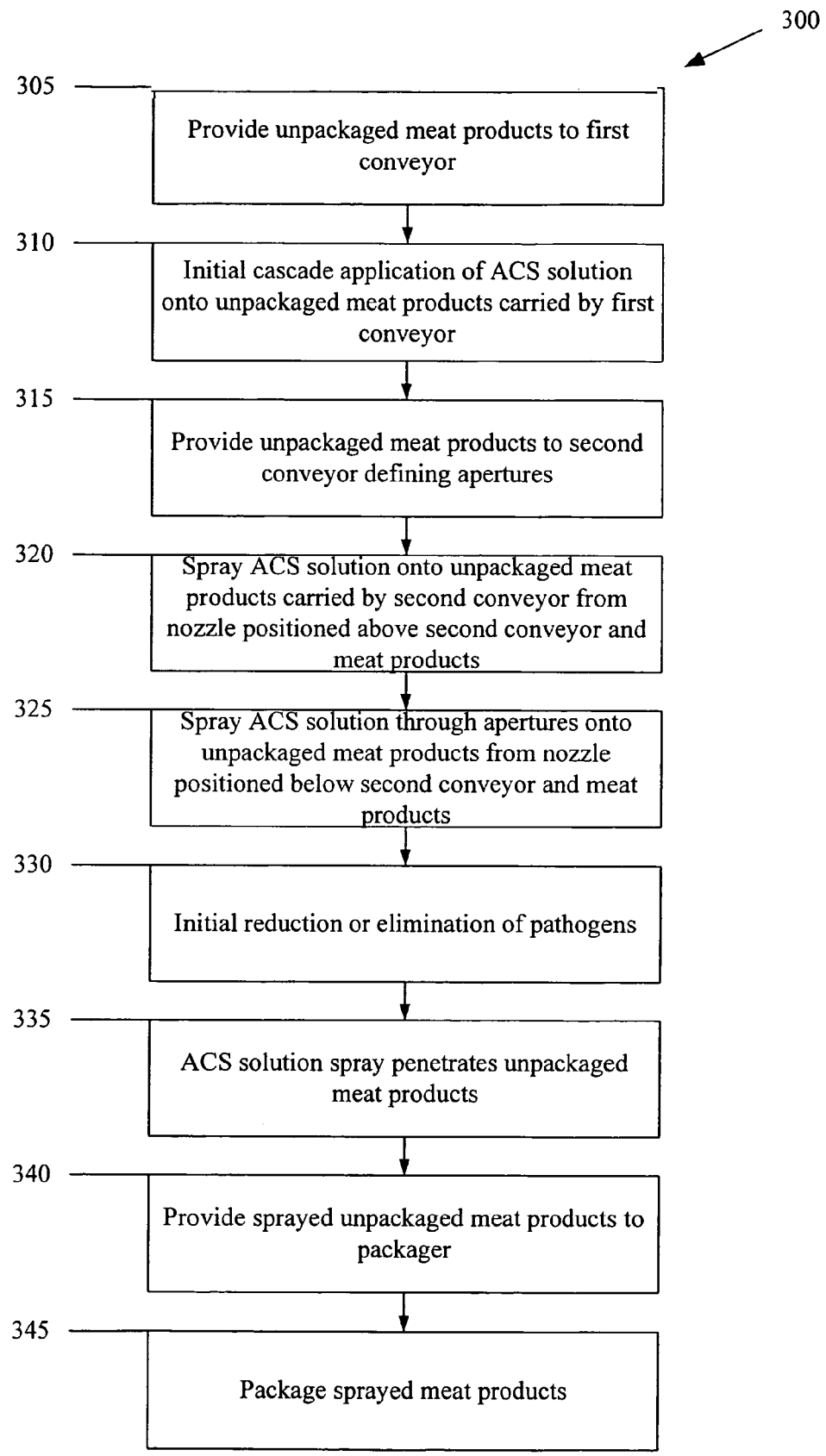
FIG. 3 is a flow chart illustrating a method of initially treating unpackaged meat products with a solution having an antimicrobial agent followed by spraying the solution onto the meat products with nozzles positioned above and below the meat products according to a further embodiment.

Referring to FIG. 3, according to a further alternative embodiment, the unpackaged meat products can be initially treated with ACS solution before being sprayed. Thus, in step 305, unpackaged meat products are provided or carried by a first conveyor. In step 310, the unpackaged meat products are treated with an initial application of ACS solution. For example, ACS solution can be released from a container and reservoir so that it drops or cascades down onto the meat products below.

In step 315, the pre-treated and unpackaged meat products are provided from the first conveyor to a second conveyor, which defines a plurality of apertures or gaps. In step 320, ACS solution is sprayed onto the pre-treated unpackaged meat products carried by the second conveyor from a nozzle positioned above the conveyor and meat products. In step 325, ACS solution is sprayed through apertures in the second conveyor and onto unpackaged meat products from a nozzle positioned below the conveyor and meat products. In step 330, the initial application of ACS solution and the ACS solution spray reduce or eliminate pathogens, and in step 325, the ACS solution penetrates into pores of the meat products and into the meat tissue. In step 330, the sprayed and unpackaged meat products are provided to a packager, and packaged or bagged in step 335.

Figure 4:
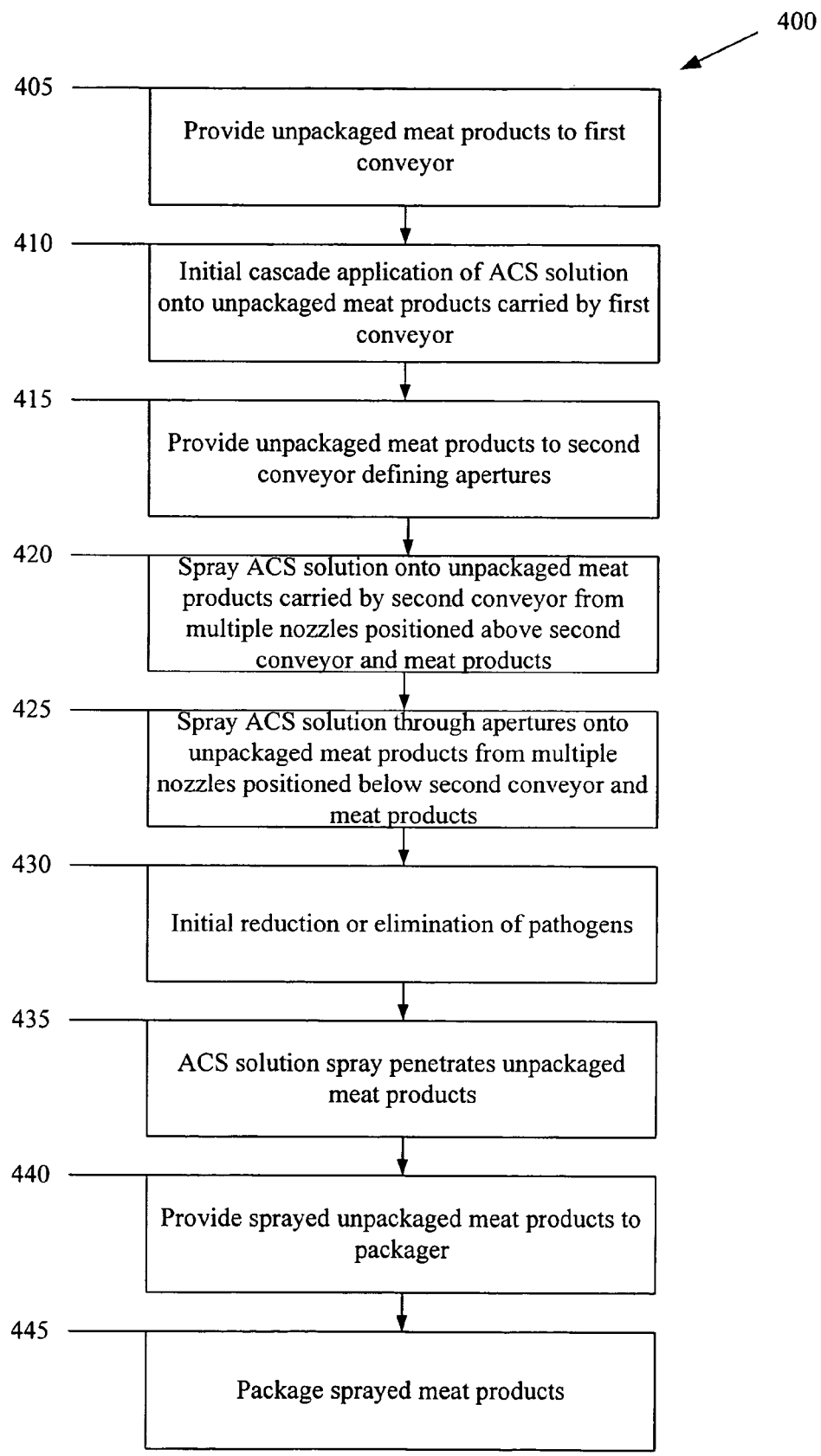
FIG. 4 is a flow chart illustrating a method of initially treating unpackaged meat products with a solution having an antimicrobial agent followed by spraying the solution onto the meat products with multiple nozzles positioned above meat products and multiple nozzles positioned below meat products according to another embodiment.

Referring to FIG. 4, in a further alternative embodiment, the method shown in FIG. 3 can be implemented using multiple nozzles positioned above a conveyor and unpackaged meat products, and multiple nozzles positioned below a conveyor and unpackaged meat products. Thus, in step 405, unpackaged meat products are provided or carried by a first conveyor, and in step 410, the meat products are initially treated with an ACS solution. In step 415, the pre-treated meat products are provided from the first conveyor to a second conveyor. In step 420, ACS solution is sprayed onto the pre-treated and unpackaged meat products carried by the second conveyor from multiple nozzles positioned above the second conveyor and meat products, and in step 425, ACS solution is sprayed through apertures in the second conveyor onto the pre-treated and unpackaged meat products from multiple nozzles positioned below the second conveyor and meat products. In step 430, the initially applied and sprayed ACS solution reduce or eliminate pathogens, and in step 435, the spray penetrates into pores of the meat products. In step 440, sprayed unpackaged meat products are provided to a packager, and packaged or bagged in step 445. FIGS. 5-10 illustrates embodiments of a system that can be used to implement these methods, and FIG. 11 is a chart summarizing the effectiveness of embodiments.

Figures 5, 6, 7:
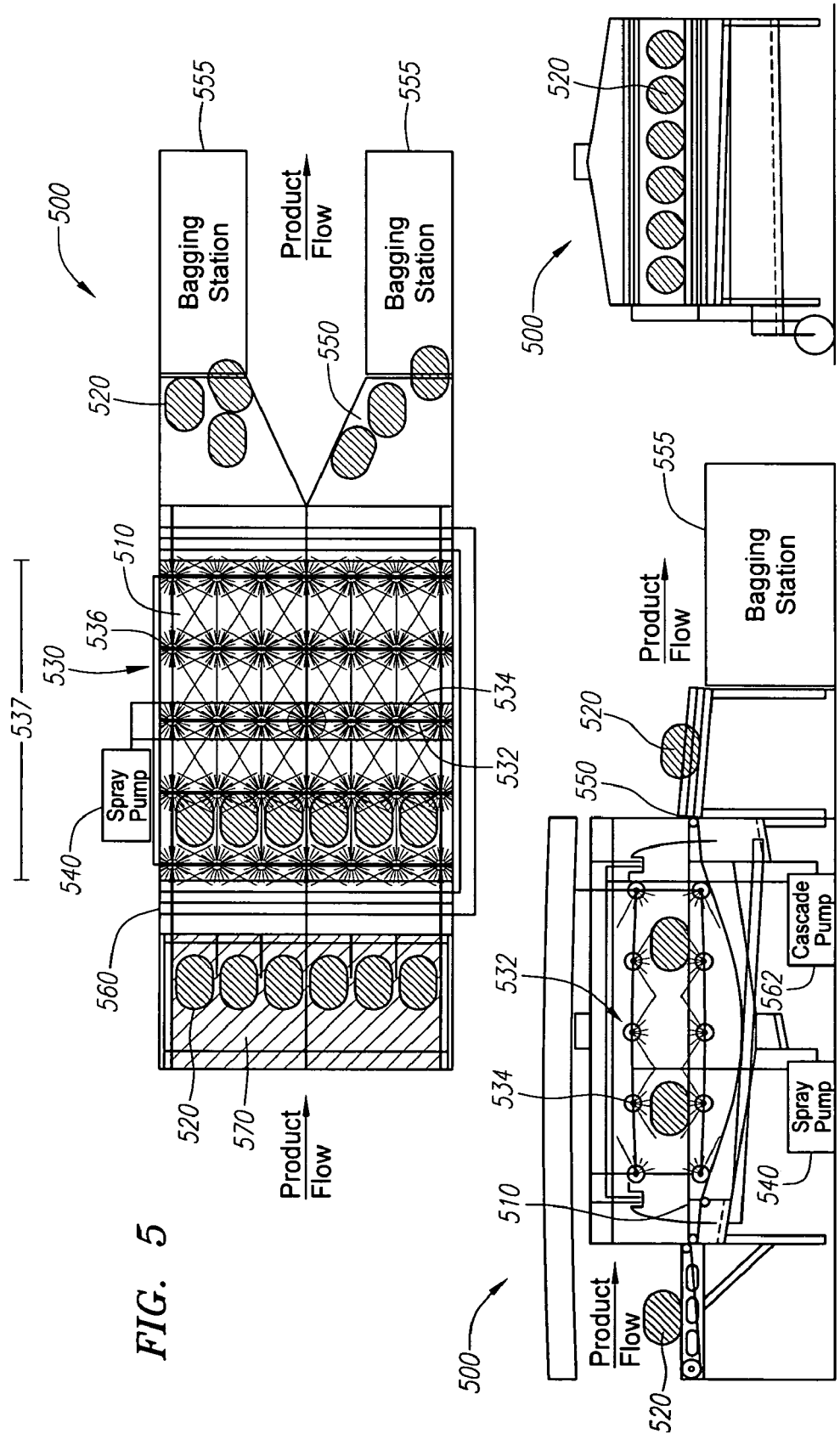
FIG. 5 is a top view of a system for spraying a solution having an antimicrobial agent onto unpackaged meat products using spray nozzles positioned above and below a conveyor carrying meat products according to one embodiment.
FIG. 6 is a side view of the system shown in FIG. 5.
FIG. 7 is a front view of the system shown in FIG. 5.

Referring to FIGS. 5-7, a system 500 according to one embodiment includes a conveyor 510 that carries unpackaged meat products 520. The conveyor 510 includes segments for supporting the meat products 520 and apertures for allowing ACS solution to be sprayed onto the bottom surfaces of the meat products 520. One exemplary conveyor 510 that can be used with embodiments is the Powrdrench Model 2000 Belt Spray System, available from Red Arrow Equipment Company, Inc., 633 South 20$^{th}$ Street, Mantiwoc, Wis. 54220. This exemplary conveyor 520 has belts that are about 36" in width and about 16' in length. The system 500 includes a spray application system or spray chamber 530 that includes nozzles that spray a solution or product from above and below the food products. In the illustrated embodiment, five bars 532 below the conveyor 510 and five bars 532 above the conveyor 510, each include one or more nozzles 534, e.g. about four to seven nozzles 534, that spray a solution 536 having ACS to create a shower zone 537. The dimensions of the shower zone 537 can vary depending on the number and size of the meat products 520 being treated. An exemplary shower zone 537 is about 96" in length.

Figure 8A:
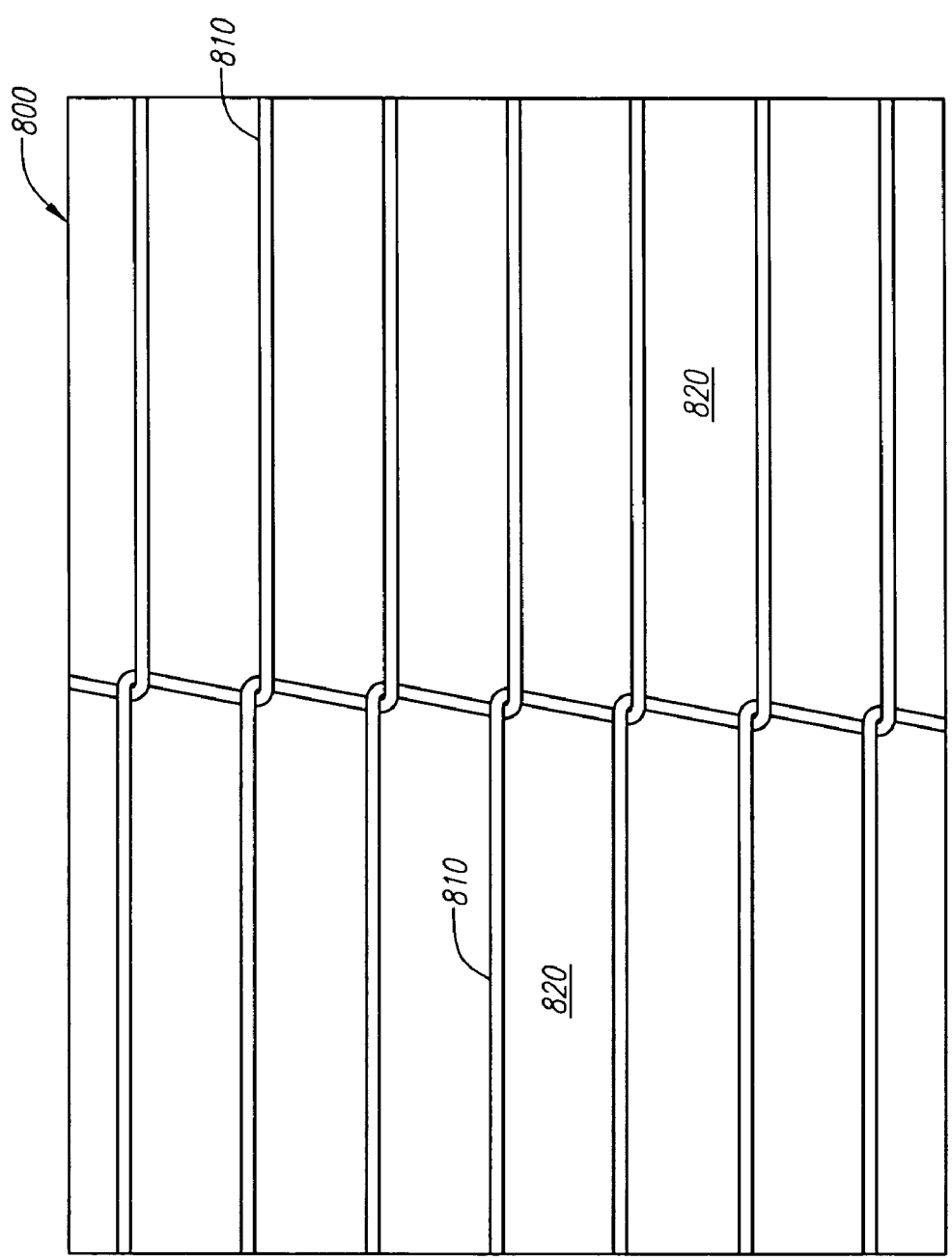
FIGS. 8A-C illustrate a conveyor having a plurality of wires or wire segments that define a plurality of apertures through which a solution having an antimicrobial agent is sprayed and applied to unpackaged meat products above.
Figure 8B:
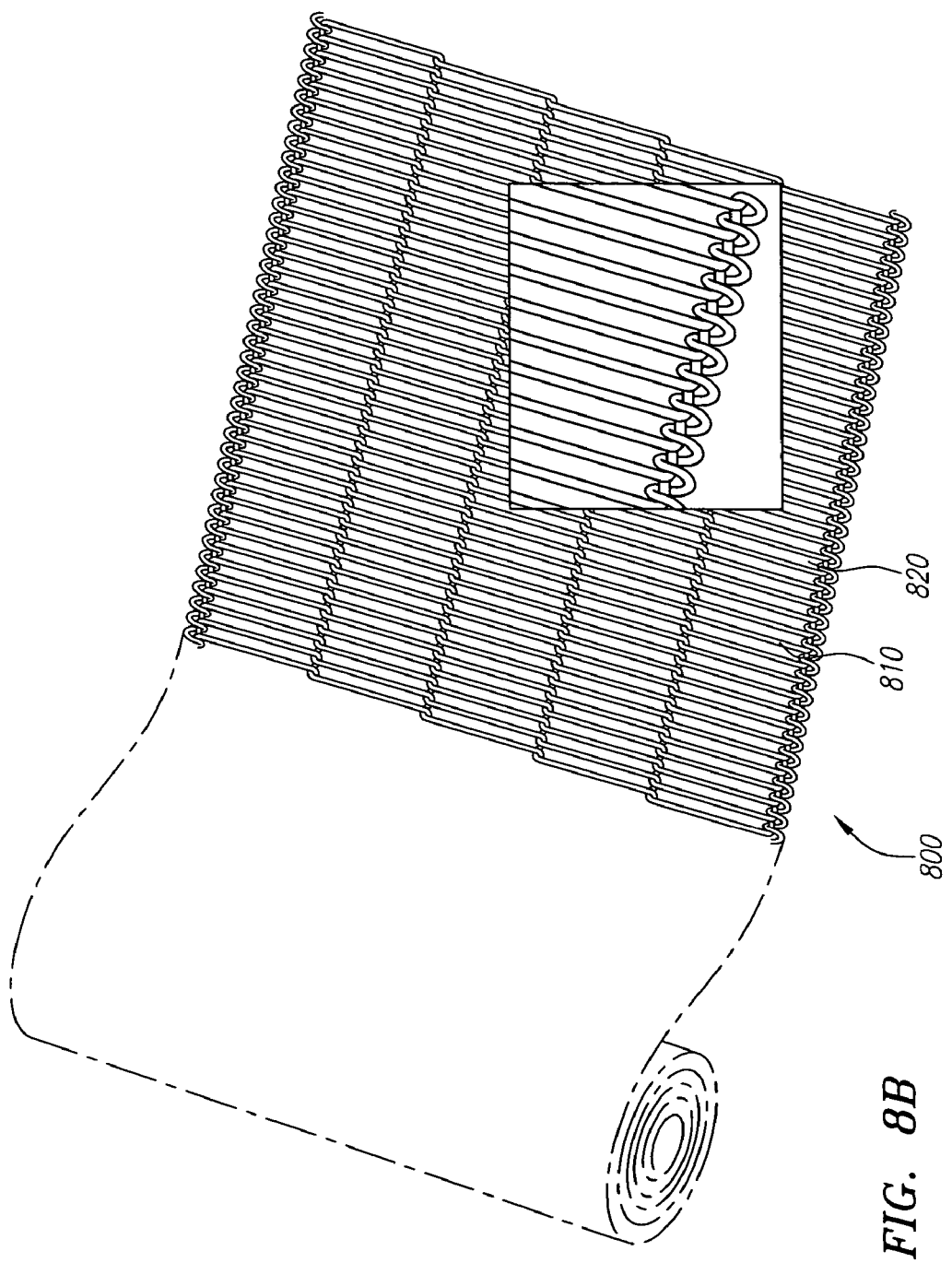
Figure 8C:
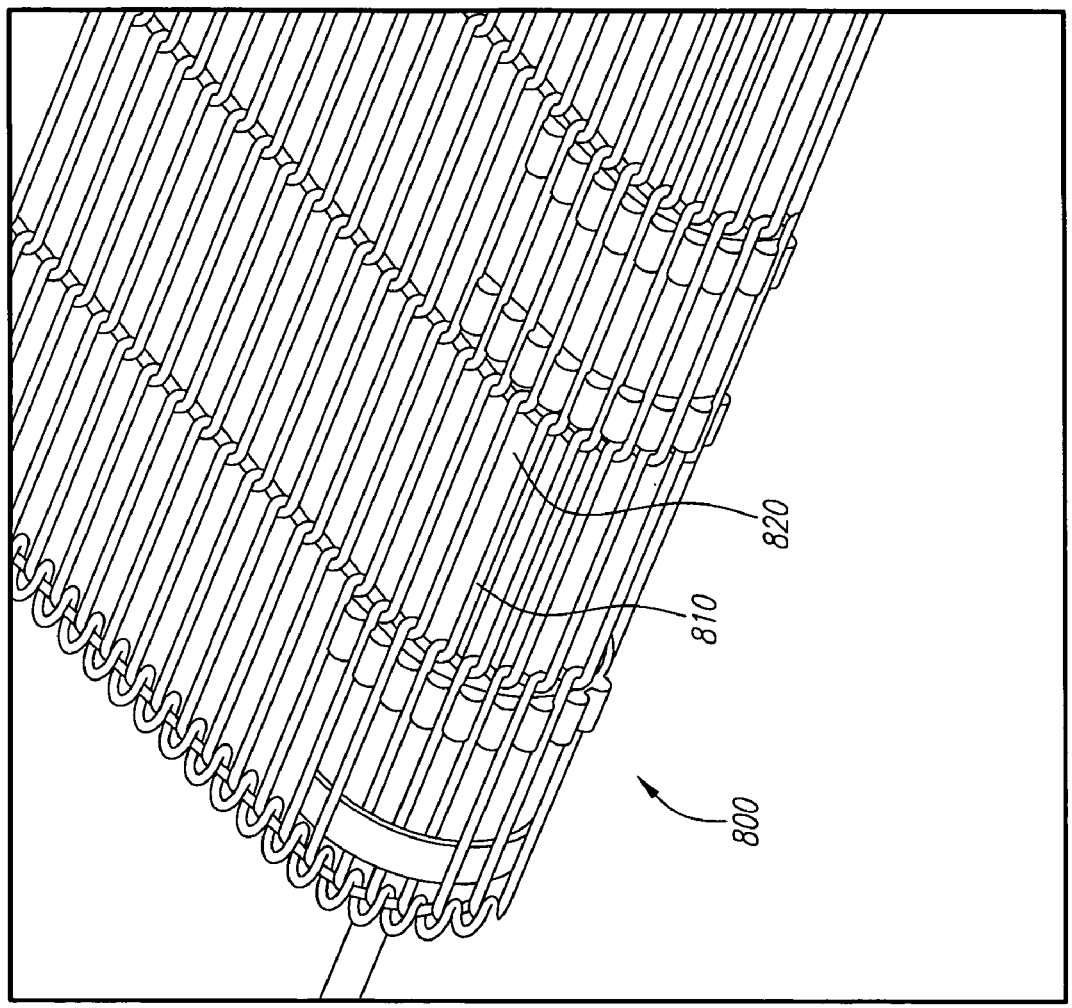

Referring to FIGS. 8A-C, according to one embodiment, the conveyor 510 can be a wire mesh conveyor 800 having wires or wire segments 810 (generally wires 810) that define multiple apertures or gaps 820. The configuration of the wires 810 and apertures 820 should be such that the conveyor 800 can support the meat products 520, but substantially all of the bottom surface of the meat product 520 is visible and can be sprayed with ACS solution 536 from a nozzle 534 positioned below the meat product 520.

An exemplary conveyor 800 is that can be used is Model No. 61367 CC stainless steel wire belt available from Wire Belt Company, 154 Harvey Road, Londonderry, N.H. 03053. Persons skilled in the art will appreciate that various conveyor belt configurations, sizes and materials can be utilized with embodiments.

According to one embodiment, the conveyor 800 includes wire belt stainless steel belting. The width of the belt 800 can vary and can be, for example, about 36". The number of wires or strands can also vary and can be, for example, about 24 wires or strands/foot. The thickness of the wires 810 can be, for example, about 0.09" in diameter, in contrast to the meat products 820, which can have dimensions of up to about 8.5"×9.5"×6", ±⅝". The diameter of the wires 810 and the sizes and dimensions of the apertures 820 defined by the wires 810 can vary depending on, for example, the size of the conveyor 800 and the dimensions and weight of the food items. For example, dimensions of the apertures 820 can be about 0.5" to about 3.5". The apertures 820 can be square, rectangular (as shown) and other shapes and sizes to suit different system configurations and meat products. Thus, the relative width of the wires 810 is small relative to the meat product 520 dimensions. For example, the width of a wire 810 can be less than about 1% of the bottom width and length dimensions of the meat product 520 to ensure that the conveyor 800 wires 810 do not block ACS solution 536 that is applied to the bottom surfaces of meat products 520, or does so to a negligible or acceptable degree.

Referring again to FIGS. 5-7, the conveyor 510 carries meat products 520 through the spray chamber 530. Nozzles 534 are positioned above the conveyor 510 and meat products 520, and additional nozzles 534 are positioned below the conveyor 510 and meat products 520. ACS solution 536 is delivered to the nozzles 534 under pressure by a pump 540, such as a centrifugal pump. ACS solution 536 is sprayed onto top and middle surfaces of the meat products 520 by the top nozzles 534, and sprayed onto bottom and middle surfaces of the meat products 520 through the conveyor apertures. After the sprayed meat products 510 exit the spray chamber 530, they can be discharged onto a table or another conveyor 550 and delivered to a packing station 555, such as a bagging station.

In the illustrated embodiment, there are 35 nozzles 534 positioned above the conveyor 510 and meat products 520 and 35 nozzles 534 positioned below the conveyor and meat products. These 70 nozzles 534 are used to ensure that a sufficient quantity of ACS solution 536 is applied to the meat products 520, and that all or substantially all of the surfaces are showered with the ACS solution 536. Exemplary nozzles 534 that can be used with embodiments include ¼ turn quick release jet nozzles, such as ¼ QJJA-SS with QGA-SS4.3W rated at 0.79 GPM@40 psi, available from Spraying Systems Co., Wheaton, Ill. 60189.

The nozzles 534 are configured so that the ACS spray 536 has characteristics that enable it to penetrate into the pores and tissue of a meat product 520. For example, the sprays should be applied at a sufficiently high pressure and have a sufficiently small drop size to penetrate into meat product tissue.

According to one embodiment, the diameter of the drops that are sprayed by the nozzles are estimated to be about, for example, 1/64" to ¼". Drop sizes can be determined or varied based on the spray pressure, spray volume and the type of nozzle that is used. According to one embodiment, a nozzle 534 emits ACS solution sprays 536 at a pressure of about 5 psi to about 50 psi, preferably about 40 psi. The volume of the ACS 536 that are solution sprays emitted by the nozzles 534 can be about 1.25-1.85 fluid ounces per square inch per minute. Applicants have determined that embodiments can be used to apply ACS solution 536 over 98% or more of the surface of a meat product 520, and up to about 99.99-100% of total product surface area (not including the area of the product that contact the wires 810 of the conveyor belt 800, exemplary wires 510 having a diameter of about 0.092").

Referring to FIGS. 5 and 6, if necessary, the unpackaged meat products 510 can be pre-treated with ACS solution 536 before being sprayed. For example, ACS solution 560 held in a reservoir or other container can be released and applied over the top of the meat products 520 before spraying. The ACS solution 536 can be delivered with a pump 562 or other suitable mechanism. In the illustrated embodiment, the meat products 520 are transported by a regular solid conveyor 570, and then provided to the conveyor 510 with apertures for purposes of being sprayed with ACS solution 536.

System operating parameters can be adjusted as necessary depending on various factors, such as the type, size, shape and number of meat products being treated, the temperature, pressure and type of ACS solution utilized, and the speed of the conveyor. One exemplary ACS solution that can be utilized with various embodiments is Safe$_2$O® ACS-RTE01, available from Mionix, 4301 Alvis Court, Rocklin, Calif. 95677. This solution can be used with various meat products, including beef, chicken and turkey. Another exemplary ACS solution suitable for use with embodiments is Safe$_2$O® ACS-RTE03, which also includes both ACS and lactic acid and can be used to treat ham products. Both the RTE01 and RTE03 solutions can be diluted with one part RTE01 or RTE03 to two to three parts water to form an ACS solution having a pH value of about 1 to about 3 for use with various embodiments. The pH value of the solution can be monitored to ensure that the pH value remains within an acceptable range. Embodiments advantageously achieve desired bacterial kills using lower ACS concentrations than known methods. For example, embodiments can utilize a 3:1 ratio water to ACS solution, whereas known dipping methods typically require higher concentrations, e.g., 2:1 ratios. Thus, embodiments use more diluted ACS sprays, which result in meat products having better taste.

The speed of the conveyor belt 510, and the speed of the meat products 520 carried by the conveyor 510, can be about 1" to about 165" per minute, e.g., 10" per minute. The speed can vary depending on, for example, product orientation, size and product type. Further, the conveyor 510 may be run continuously, periodically or intermittently if it is desired to hold a meat product 520 under a ACS solution spray 536 for additional spray application or penetration. In one embodiment, the conveyor 510 speed is controlled so that meat products are showered by ACS solution sprays for about 5 to 60 seconds, preferably about 20 to 40 seconds.

ACS solutions 536 of different temperatures can be applied to meat products 520. For example, the temperature of the ACS solution 536 can be about 33° F. to about 200° F., preferably about 35° F. to about 190° F. According to one embodiment, the ACS solution 536 temperature is about 140° F., and according to another embodiment, the ACS solution 536 temperature is about 190° F.

Figure 9:
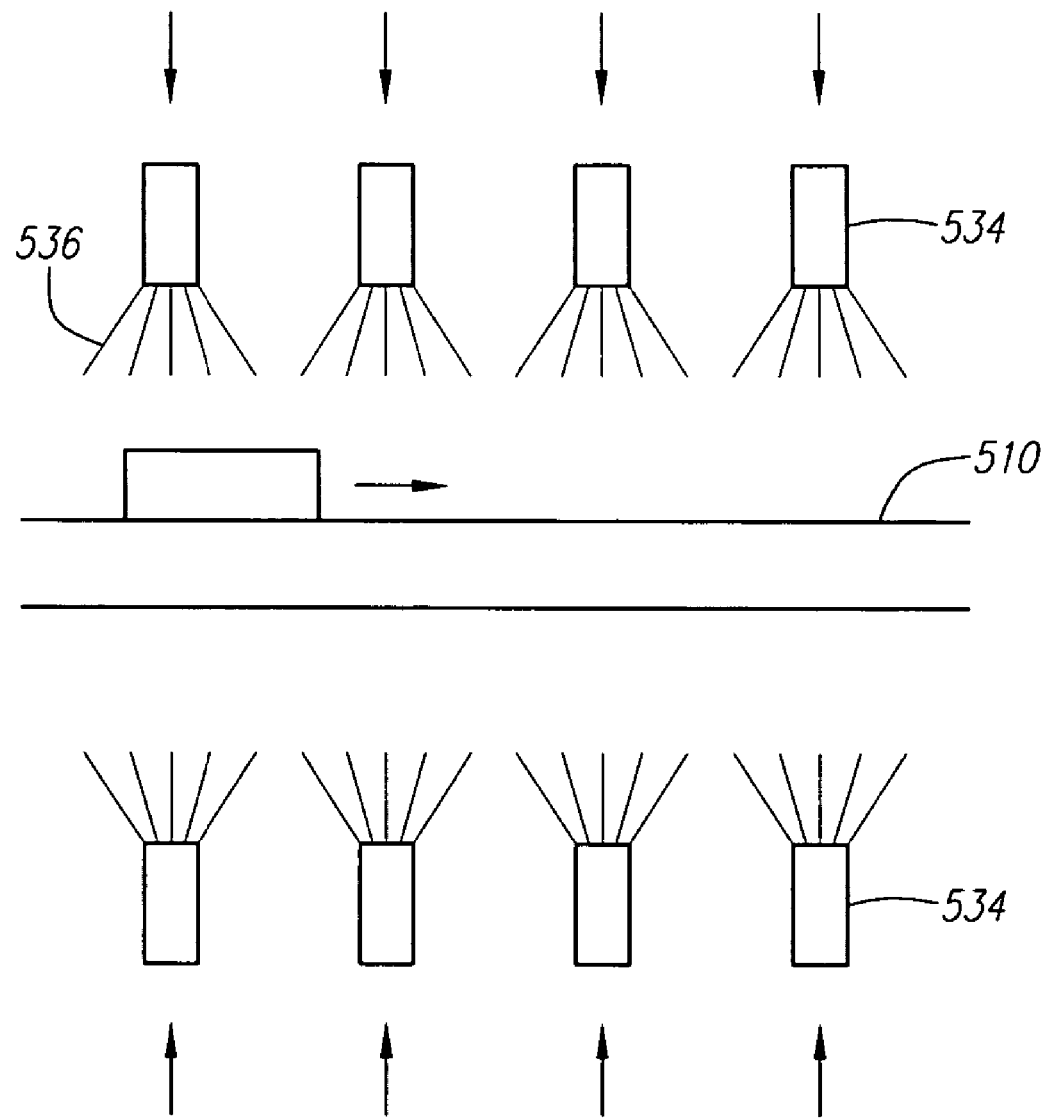
FIG. 9 illustrates spray nozzles that face in opposite directions according to one embodiment.
Figure 10:
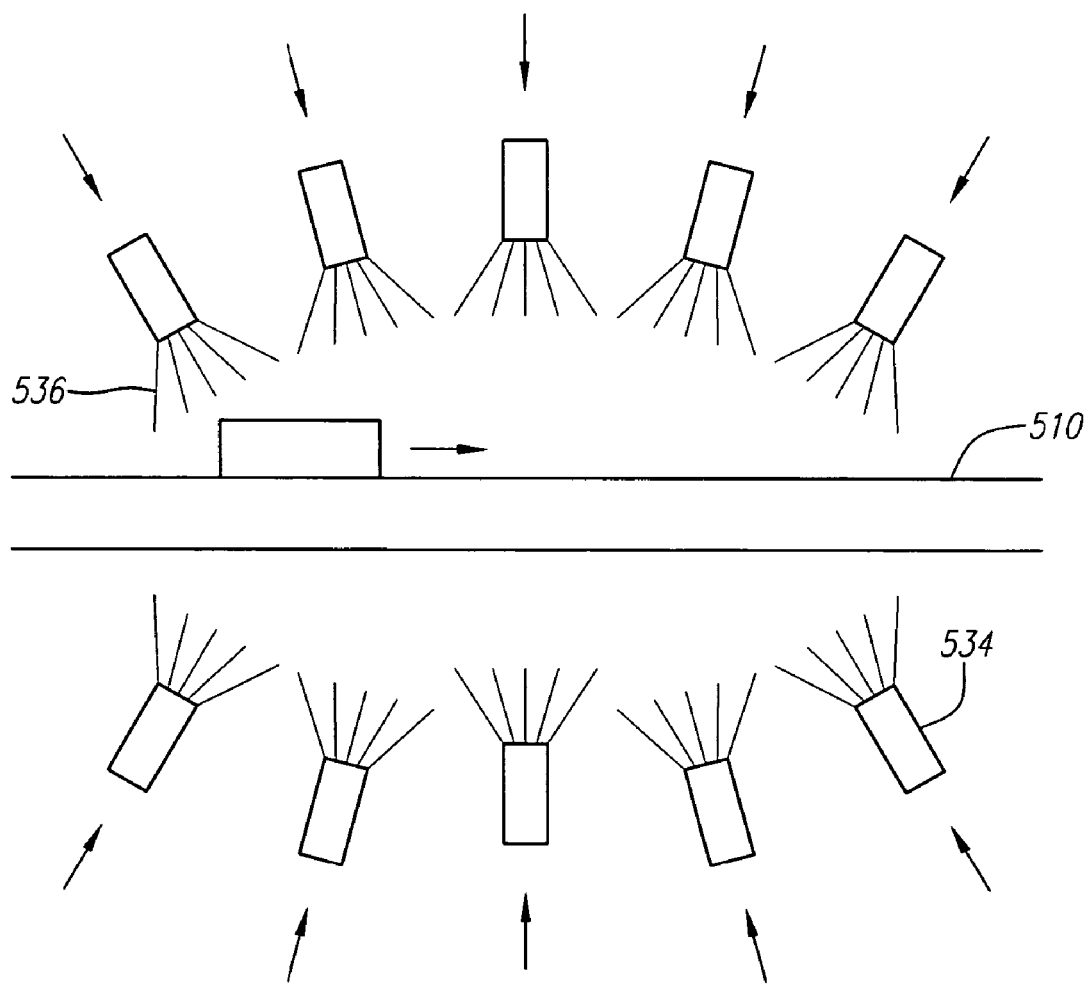
FIG. 10 illustrates spray nozzles that face in a plurality of different directions according to another embodiment.

Persons skilled in the art will appreciate that the embodiment shown in FIGS. 5-8C can be expanded or reduced as necessary. The system can process one, two, ten or 100 rows of meat products as necessary. Further, various nozzles and spray patterns can be utilized. For example, FIG. 9 illustrates top and bottom nozzles 534 that face each other. Referring to FIG. 10, the nozzles 534 can be arranged at various angles to provide the desired ACS spray pattern. The particular arrangement and positioning of nozzles 534 can be selected to achieve desired spray characteristics to treat various numbers, sizes and types of meat products 520.

FIG. 11 is a chart summarizing test results that demonstrate the effectiveness and advantages of embodiments of the invention. The chart demonstrates how embodiments satisfy Alternatives 1 and 2 set forth by the USDA and FSIS to reduce and prevent and control growth of *L. monocytogenes* over extended periods of time with various meat products. These particular tests involved applying ACS solutions from multiple nozzles positioned above the meat products and multiple nozzles positioned below the meat products, as shown in FIGS. 6 and 9. In these tests, ACS solution was sprayed from nozzles at a pressure of about 6-20 psi, with a drop size of about 1/64" to 1/4" and at different temperatures and spray exposure or shower times.

The first column 1110 of the chart identifies the type of unpackaged meat product that was tested. These tests involved turkey, ham and roast beef meat products. The second column 1120 indicates the amount of time that the meat products were exposed to an ACS spray. Certain products were exposed for 20 seconds, and other meat products were exposed for 40 seconds. The third column 1130 indicates the temperature of the ACS solution that was sprayed onto the meat products. The temperatures that were tested included 40° F., 140° F. and 190° F. The fourth column 1140 indicates which type of ACS solution was used. The first 11 tests used RTE 01 solution, and the remaining six tests used RTE 03 solution.

The fifth column 1150 of the chart indicates the extent to which *L. monocytogenes* were reduced when the ACS solution was sprayed on the meat products. All of the tests satisfied Alternatives 1 and 2 (Jun. 6, 2003), both of which require a greater than 1 log reduction since the log reductions for these tests ranged from 1.79 log reduction (ham 1) to 3.88 log reduction (roast beef 3). Further, all but one of the tests exceeded the requirements of the more recent Alternative 1 standard (Jan. 1, 2005), which requires greater than 2 logs reduction.

The sixth column 1160 indicates the maximum increase of *L. monocytogenes* that was observed during the duration of the 70 days. "No change" in column 1160 indicates that there was no growth. Other values indicate the maximum amount of *L. monocytogenes* that was observed during the 70 day test period. As shown in column 1160, all but two of the tests satisfied Alternatives 1 and 2 (Jun. 6, 2003), both of which require less than 2 logs of growth. Further, more than half of the tests satisfied Alternative 1 (Jan. 1, 2005), which requires less than 1 log of growth. Other tests with 1.02 and 1.11 log growth were very close to meeting the Jan. 1, 2005 Alternative 1 standard.

The seventh column 1170 compares the amount of *L. monocytogenes* that existed at the beginning of the 70 day period after lethality testing (column 1250) and the amount of *L. monocytogenes* that existed at the end of the 70 day period. "No change" indicates that there was no *L. monocytogenes* growth. "Minus" indicates that the amount of *L. monocytogenes* at the end of the 70 days was actually less than the amount of *L. monocytogenes* present at the beginning of the test. Other values indicate the amount of *L. monocytogenes* present at the end of the 70 days period. In this test, the shelf life was 70 days, and the storage temperature was 4° C. The seventh column 1170 indicates all but two of the tests satisfied Alternatives 1 and 2 (Jun. 6, 2003), which require less than 2 logs of growth. Further, a majority of the tests satisfied Alternative 1 (Jan. 1, 2005), which requires less than 1 log of growth.

The data in the eighth column 1180 summarizes which Alternative was satisfied based on the standards in effect beginning on Jun. 6, 2003 and the data in column 1190 indicates which Alternative was satisfied based on the standards in effect beginning on Jan. 1, 2005. As shown in columns 1180 and 1190, embodiments of the invention are very effective in initial reductions of *L. monocytogenes* and in controlling future growth of *L. monocytogenes*. Embodiments provide capabilities and results that are not otherwise attainable by known dip and spray methods and systems.

Embodiments of the invention advantageously apply ACS solution sprays from multiple directions (e.g., 360 degrees) to various meat products so that the solution is applied to all or substantially all of the meat product surfaces. These sprays initially reduce meat product bacterial pathogens, and also penetrate meat product surfaces so that pathogen growth is prevented or controlled. Embodiments also advantageously use ACS sprays at certain temperatures so that the synergistic effect of ACS and solution temperature achieve desired bacterial reductions and prevent growth. Further, embodiments can achieve desired bacterial kills using lower ACS concentrations than known methods to maintain meat product taste. Persons skilled in the art will appreciate that these benefits can be achieved with certain insubstantial modifications, alterations, and substitutions relative to the described embodiments without departing from the scope of the invention, as recited in the accompanying claims.

What is claimed:

1. A method for applying acidified calcium sulfate to meat products to eliminate or reduce food borne pathogens, comprising the steps of:

providing a plurality of unpackaged meat products on a conveyor defining a plurality of apertures;

cascading an initial treatment of acidified calcium sulfate solution over the unpackaged meat products, wherein the acidified calcium sulfate solution comprises one part acidified calcium sulfate to two to three parts water and a pH of about 1 to about 3;

after the initial treatment, spraying the acidified calcium sulfate solution at a pressure of about 5 psi to about 50 psi and a drop size of about 1/64 inch to about 1/4 inch onto the unpackaged meat products from a top nozzle positioned above the conveyor and from a bottom nozzle positioned below the conveyor so that the acidified calcium sulfate solution penetrates into tissue of the unpackaged meat products, wherein acidified calcium sulfate solution sprayed by the bottom nozzle passes through the conveyor apertures and is applied to the bottom surfaces of the unpackaged meat products.

2. The method of claim 1 being performed without dipping unpackaged meat products into acidified calcium sulfate solution.

3. The method of claim 1, the top and bottom nozzles spraying acidified calcium sulfate solution onto the unpackaged meat products simultaneously.

4. The method of claim 1, the top and bottom nozzles spraying acidified calcium sulfate solution onto the unpackaged meat products at different times.

5. The method of claim 1, providing the unpackaged meat products comprising transporting the unpackaged meat products on the conveyor at a speed of about 1 to 165 inches per second.

6. The method of claim 1, spraying comprising spraying acidified calcium sulfate solution onto the unpackaged meat products for about 5 to 60 seconds.

7. The method of claim 1, spraying comprising spraying acidified calcium sulfate solution at a temperature of about 140° F.

8. The method of claim 1, spraying comprising spraying acidified calcium sulfate solution at a temperature of about 190° F.

9. The method of claim 1, spraying comprising spraying acidified calcium sulfate solution at a temperature of about 40° F.

10. The method of claim 1, spraying comprising spraying acidified calcium sulfate solution onto at least 99% of the surface of an unpackaged meat product.

11. A method for spraying acidified calcium sulfate to meat products to eliminate or reduce food borne pathogens, comprising the steps of:
  providing a plurality of unpackaged meat products on a conveyor defining a plurality of apertures;
  cascading an initial treatment of acidified calcium sulfate solution over the unpackaged meat products, wherein the acidified calcium sulfate solution comprises one part acidified calcium sulfate to two to three parts water and a pH of about 1 to about 3;
  after the initial treatment, spraying the acidified calcium sulfate solution at a pressure of about 5 psi to about 50 psi and a drop size of about 1/64 inch to about 1/4 inch onto substantially all of the surfaces of each unpackaged meat product from a plurality of nozzles positioned above the conveyor and from a plurality of nozzles positioned below the conveyor, wherein the pressure and the drop size cause the acidified calcium sulfate solution to initially penetrate into tissue of the unpackaged meat products,
  wherein acidified calcium sulfate solution sprayed from the plurality of nozzles positioned below the conveyor passes through the conveyor apertures and onto the bottom surfaces of the meat products, and no acidified calcium sulfate solution is applied to the unpackaged meat products by dipping unpackaged meat products into acidified calcium sulfate solution; and
  after spraying, conveying the unpackaged meat products to a packaging operation where the meat products are packaged, wherein the packaged meat products yield less than two log microbial growth at a 70 day age.

12. The method of claim 11, providing the unpackaged meat products comprising transporting the unpackaged meat products on the conveyor at a speed of about 1 to 165 inches per second.

13. The method of claim 11, spraying comprising spraying acidified calcium sulfate solution onto the unpackaged meat products for about 5 to 60 seconds.

14. The method of claim 11, spraying comprising spraying acidified calcium sulfate solution at a temperature of about 140° F.

15. The method of claim 11, spraying comprising spraying acidified calcium sulfate solution at a temperature of about 190° F.

16. The method of claim 11, spraying comprising spraying acidified calcium sulfate solution at a temperature of about 40° F.

17. The method of claim 11, wherein acidified calcium sulfate solution is sprayed onto at least 99% of the surface of the unpackaged meat product.

18. A system for applying acidified calcium sulfate to meat products to eliminate or reduce food borne pathogens comprising:
  an acidified calcium sulfate solution comprising one part acidified calcium sulfate to two to three parts water and a pH of about 1 to about 3;
  an initial treatment station for cascading the acidified calcium sulfate solution over the unpackaged meat products;
  a conveyor for transporting unpackaged meat products from the initial treatment station, the conveyor defining a plurality of apertures;
  a first nozzle positioned above the conveyor for spraying acidified calcium sulfate solution onto unpackaged meat products below the first nozzle; and
  a second nozzle positioned below the conveyor for spraying acidified calcium sulfate solution onto unpackaged meat products above the second nozzle,
  wherein the acidified calcium sulfate solution is cascaded over the unpackaged meat product at the initial treatment station,
  wherein the first and second nozzles spray acidified calcium sulfate solution at a pressure of about 5 psi to about 50 psi and a drop size of about 1/64 inch to about 1/4 inch so that the acidified calcium sulfate solution penetrates into tissue of the unpackaged meat products, and
  wherein acidified calcium sulfate solution sprayed from the bottom nozzle passes through the conveyor apertures and is applied to the bottom surfaces of the unpackaged meat products.

19. The system of claim 18, wherein the conveyor is a mesh conveyor having segments that define a plurality of apertures.

20. The system of claim 19, the mesh conveyor having segments capable of supporting a plurality of unpackaged meat products that each weigh up to about ten pounds.

21. The system of claim 19, wherein the segments are wires.

22. The system of claim 19, wherein each segment has a thickness of about 0.09", and a dimension of the apertures defined by the segments is about 0.5" to about 3.5".

23. The system of claim 19, wherein the thickness of a segment is about 1% or less than the width or length of the bottom of an unpackaged food product so that substantially all of a bottom surface of an unpackaged food item can be sprayed with acidified calcium sulfate solution by the second nozzle.

24. The system of claim 18, wherein the first and second nozzles spray acidified calcium sulfate solution at a temperature of about 140° F.

25. The system of claim 18, wherein the first and second nozzles spray acidified calcium sulfate solution at a temperature of about 190° F.

26. The system of claim 18, wherein the first and second nozzles spray acidified calcium sulfate solution having a temperature of about 40° F.

27. The system of claim 18 being configured so that acidified calcium sulfate solution is sprayed onto at least 99% of the surface of an unpackaged meat product.

28. The system of claim 18, the solution having a concentration of three parts water to one part solution.

29. A method for applying acidified calcium sulfate to meat products to eliminate or reduce food borne pathogens, comprising:
  providing a meat treatment conveyance system, wherein the meat treatment conveyance system includes:
    an initial treatment station,
    a spray treatment station,
    a conveyor for transporting the meat product in the meat treatment conveyance system, wherein the conveyor has a plurality of wires that define a plurality of apertures, wherein the ratio of the width of the wire to the length of the width of the bottom surface of the meat product is sufficiently low so that substantially all of the bottom surface of the meat product is exposed,
    at least one solution reservoir, wherein the at least one solution reservoir includes an acidified calcium sulfate solution having one part acidified calcium sulfate and two to three parts water, wherein the acidified calcium sulfate solution has a pH of about 1 to about 3,
a first plurality of nozzles in fluid communication with the at least one solution reservoir, wherein the first plurality of nozzles are positioned above the conveyor, and
a second plurality of nozzles in fluid communication with the at least one solution reservoir, wherein the second plurality of nozzles are positioned below the conveyor,
applying an initial treatment of the acidified calcium sulfate solution at the initial treatment station, wherein the acidified calcium sulfate solution is cascaded over the meat product;
after the initial treatment, conveying the meat product through the spray treatment station, wherein the acidified calcium sulfate solution is sprayed from the first plurality of nozzles onto at least top surfaces of the meat product located on the conveyor, wherein the acidified calcium sulfate solution is sprayed from the second plurality of nozzles through the apertures in the conveyor onto at least bottom surfaces of the meat product located on the conveyor, wherein that acidified calcium sulfate solution is sprayed from the first plurality of nozzles and the second plurality of nozzles at a pressure of about 5 psi to about 50 psi and at a drop size of about 1/64 inch to about 1/4 inch, wherein the pressure and the drop size of the spray cause an initial penetration of the meat product and forces the calcium sulfate solution into tissues of the meat product; and
after the spray treatment, conveying the meat product to a packaging operation where the meat product is packaged, wherein the meat product yields less than two log microbial growth at a 70 day age.

30. The method of claim 1, wherein the food borne pathogen is *Listeria*.

31. The method of claim 1, wherein the acidified calcium sulfate solution is applied to the unpackaged meat product at a pressure of about 6 psi to about 20 psi.

32. The method of claim 1, wherein the acidified calcium sulfate solution comprises lactic acid.

33. The method of claim 11, wherein the food borne pathogen Is *Listeria*.

34. The method of claim 11, wherein the acidified calcium sulfate solution is applied to the unpackaged meat product at a pressure of about 6 psi to about 20 psi.

35. The method of claim 11, wherein the acidified calcium sulfate solution comprises lactic acid.

* * * * *